Aug. 31, 1965   J. H. BREISCH ETAL   3,203,161
ROTARY LAWN MOWER CUTTING UNIT
Filed May 10, 1963   2 Sheets-Sheet 1

INVENTORS,
JOHN H. BREISCH &
BY ARNOLD E. BIERMANN

ATTORNEY.

INVENTORS.
JOHN H. BREISCH &
BY ARNOLD E. BIERMANN

ATTORNEY.

United States Patent Office 3,203,161
Patented Aug. 31, 1965

3,203,161
ROTARY LAWN MOWER CUTTING UNIT
John H. Breisch, 2103 Arthur Ave., Lakewood 7, Ohio, and Arnold E. Biermann, Redart, Va.
Filed May 10, 1963, Ser. No. 279,399
3 Claims. (Cl. 56—295)

This invention relates to a rotary type grass mowing machine and more particularly to a mowing machine wherein a low mass cutting element is pivotally mounted at the periphery of the rotor.

An object of this invention is to provide an efficient, compact, safe, rotary type mowing machine capable of uniform and smooth cutting of grass.

The rotary type mowing machine has achieved wide acceptance by individual users because of its relative simplicity and low cost of manufacture compared with other types of lawn mowers. In the early development of the rotary mowing machine, a solid blade was used as the cutting element rotating at high speed in a horizontal plane. The solid blade is simple and economical to manufacture but has serious deficiencies in that serious injuries have resulted from mower accidents to the extent of dismemberment caused by contact with the rotating blade. Further, the solid blade moving at high speed is capable of picking up solid objects, such as stones and pieces of metal, and propelling them at high velocity for great distances. This has also produced serious injuries when the operator or an individual in the vicinity has been struck by such objects.

A further problem inherent in the conventional blade is the considerable thickness which requires frequent sharpening if the blades of grass are to be severed without bruising and tearing the remaining ends of the standing grass. When the blade strikes a solid object, the edge of the blade is no longer capable of cutting the grass cleanly. Such a dull blade tears the grass rather then cutting it and thus produces a brown tip on the grass blades, and seriously affects the growth of the lawn.

The above problem has been solved by the subject invention while retaining all the advantages of the rotary type mower. A rotor is provided having a substantially smooth under surface to which a plurarality of cutters is rotatably attached. The cutters are of low inertia in comparison with the cutter bars previously used with rotary type mowers. The cutters are held in their radially cutting position by the centrifugal force resulting from the rotation of the rotor. However, since the only restraint against the rotation of the cutters relative to the rotor is the centrifugal force, the cutters are free to deflect on striking a solid object. Since the cutters are light in weight, the inertia of the cutter is small relative to such a solid object, which results in negligible velocity being transmitted to such an object.

The smoothly upturned flange on the rotor provides the necessary air flow for erecting the grass and disposing of the clippings from the area being mowed. The cutting edge on the cutters is disposed below the upturned flange thus operating in a region of maximum flow of air thereby achieving uniform cutting of the grass.

The cutters have a cross-sectional profile which tends to enhance the vertical flow of air at the desired point of cutting. The trailing edge of the cutter blade is turned upwardly, thus tending to propel the air upwardly as the rotor turns. The forward edge of the cutter is turned downwardly to provide a blunt frontal portion to a solid object with a shearing cutting edge at the lower margin of the front portion. In the event the cutter would strike the foot of the mower operator, the cutter would not penetrate the shoe, but would deflect out of the way without injuring the mower operator.

Accordingly, it is an object of this invention to provide a mower with a cutting means on a rotor having loosely mounted individual cutters said rotor including air pumping means for inducing air flow at the cutters capable of holding the grass erect as it is severed.

A further object of the invention is to provide a cutter for a rotary mower wherein the cutting elements are individual lightweight blades mounted for free deflection on striking a solid object, said cutter blades being incapable of picking up and propelling solid objects with harmful force from the mower.

Another object of the invention is to provide a cutter for a rotor to be used with a rotary mower having a rear upturned flange for inducing vertical flow of air and a forward downward turned flange to provide a blunt forward edge to prevent injury to the operator of the mower in the event the cutter strikes the operator's body.

Other objects and advantages more or less ancillary to the foregoing, and the manner in which all the various objects are realized, will appear in the following description, which considered, in connection with the accompanying drawings, sets forth the preferred embodiment of the invention.

It is to be understood that the terminology employed here is for the purpose of description and not of limitation. For simplicity of description, the word "grass" will be used to designate flora such as weeds, grass, and other vegetation normally susceptible to mowing.

Figure 1:
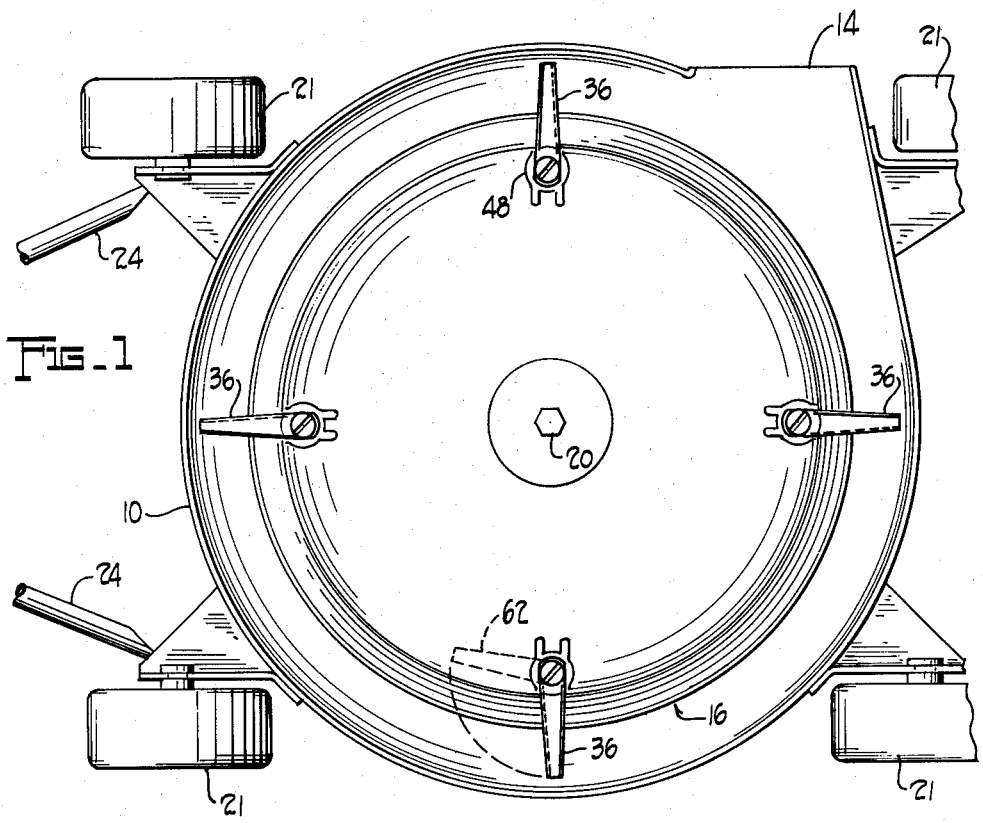
FIG. 1 is a bottom plan view of the preferred embodiment of our invention showing the rotor assembly in place on the mower.
Figure 2:
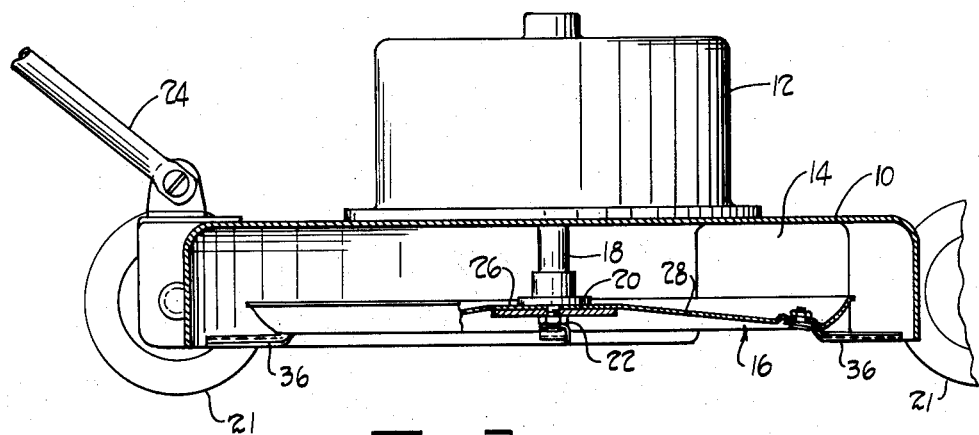
FIG. 2 is a vertical sectional view of the mower of FIG. 1.
Figure 3:
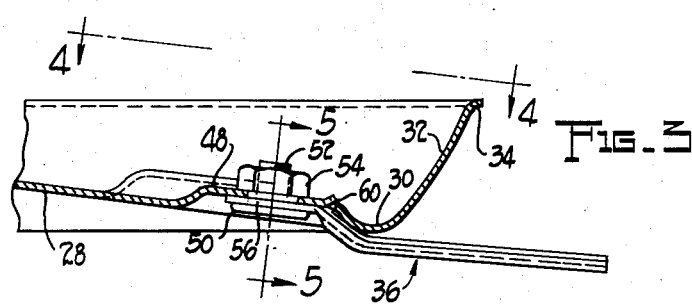
FIG. 3 is a fragmentary sectional view taken radially through the cutter mounting on the rotor.
Figure 4:
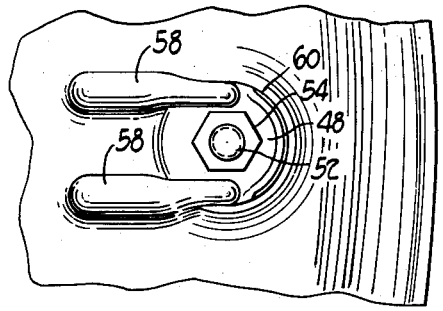
FIG. 4 is a fragmentary top plan view of the rotor taken along line 4—4 of FIG. 3.
Figure 5:
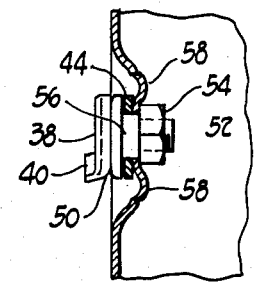
FIG. 5 is a fragmentary sectional view of the rotor taken along line 5—5 of FIG. 3.
Figure 6:
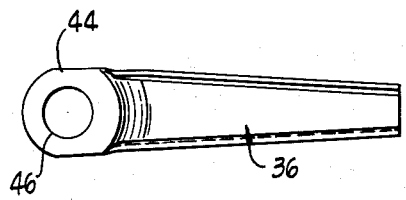
FIG. 6 is a detail top plan view of the cutter.
Figure 8:
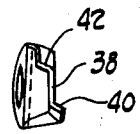
FIG. 8 is an end view of the cutter.
Figure 7:
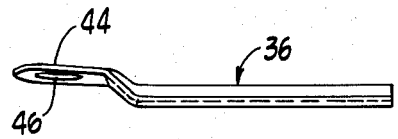
FIG. 7 is a side view of the cutter.

Referring to the drawings the preferred embodiment of the invention is illustrated in FIGS. 1 and 2 in which the numeral 10 designates a substantially circular housing 10, having a closed top and open bottom, upon which a motor or gasoline engine 12 is mounted. The housing 10 is provided with a discharge opening 14 through which the grass cuttings are discharged to one side of the mower. A rotor 16 is mounted on the engine shaft 18 with a flange 20 and nut 22, being provided for rigidly and removably affixing the rotor 16 to the shaft 18.

A plurality of wheels 21 are rotatably mounted to the housing 10 for carrying the mower over the terrain to be mowed. A handle 24 pivotally joined to the mower housing 10, provides means for the operator to push the mower during the mowing operation.

The rotor 16 has a central flat potrion 26 engageable with the flange 20 and a frusto-conical section 28 integral therewith and extending uniformly outwardly from the portion 26 and terminates in a radial transition 30 which is at the lowermost portion of the rotor 16 at the level of the nut 22. An upwardly and outwardly extending flange 32 having a slightly curved section is a contiunation of the radially curved transition 30. At the upper terminus of the flange 32 an outturned lip 34 is formed thereon to stiffen the rotor 16 and to improve the aerodynamic characteristics thereof. As the rotor is revolved by the engine 12, air is drawn under the rotor 16, and moves radially along the surface of the section 28, around the curved transition 30 and upwardly along the flange 32, where it is discharged upwardly and outwardly by the lip 34. The upwardly flow of air at this point results in air flowing radially inward toward the rotor and then being deflected sharply upward at the flange 32. This results in the blades of grass being lifted into a vertical erect position by the pumping action of the rotor. The radial transition 30 provides a rounded section which allows the rotor 16 to slide over projections or obstructions in the terrain as well as providing an aerodynamically clean surface which enhances the flow of the air from the radial to the vertical direction.

A cutter generally designated as 36 is pivotally mounted on the conical section 28 and disposed with its cutting section beneath the flange 32. The cutter 36 has a substantially flat central portion 38 with a downturned edge 40 along one side therof. An upturned edge 42 is formed at the opposite side of the flat portion 38 to the downturned edge 40. The downturned edge 40 is sharpened at the lowermost margin thereof, and provides a cutting edge which severs the grass upon high speed rotation of the rotor 16. The upper surface of the downturned edge 40 cooperates with the upturned edge 42 to provide propeller like action to enhance the vertical flow of air in the cutting area. It is noted also that the downturned edge 40 provides a blunt edge upon striking a solid object or the flesh of the operator, thus, reducing the hazard of cutting through a shoe or skin of the operator. The mounting portion 44 of the cutter 36 is off-set in relation to the flat portion 38 and has an opening 46 formed therein.

The conical section 28 near its outer periphery has a plurality of bosses 48 formed therein, said bosses 48 extending upwardly from the plane of the lower surface of the conical section 28. The underside of the boss 48 provides a recess for receiving the head 50 of bolt 52 which projects through the opening in the boss 48. Bolt 52 is secured in position by nut 54 on the upper side of the boss 48. Bolt 52 is provided with a shoulder 56 which has a height slightly greater than the thickness of the mounting 44 of the cutter 36. The opening in cutter 46 is rotatable on the shoulder 56 and thus the bolt 52 secures the cutter 36 to the rotor 16, in cutting position. It is noted that the off-set position of the cutter 36 is sufficient to position the cutter section below the radial transition on the rotor 16 without interference. Since the cutter 36 is rotatable in either direction, this allows the same to swing out of the way in the event an obstruction is engaged, because bolt 52 has its axis perpendicular to the plane of the conical section. When the cutter 36 rotates under the rotor, the entire cutter 36 is above the lowermost portion of the rotor 16.

A pair of strengthening ribs 58 is formed on the upper side of the conical section 28 and extends to the center line of the boss 48, said bosses 48 being tangential to the width of the boss 48. Ribs 58 strengthen the rear portion of the boss against bending resulting from deflection loads tending to distort the boss as a result of the cutter 36 striking obstruction while operating in brush or weeds. The boss 48 is pierced throughout half its circumference as at 60 extending from the end of one rib 58 to the end of the second rib 58 which provides flexibility and shock absorbing charcteristics in order to enhance the life of the cutter 36.

In operation the mower engine rotates the rotor at conventional or slightly lower speeds which cause the cutter 36 to be thrown outwardly by centrifugal force until it operates in the radial outward position. During the normal operation of the mower the cutters remain in this position severing the grass as they pass through their path of travel. Upon striking an obstruction such as a curb, sidewalk, or other solid objects, the cutter 36 is free to rotate into a position as indicated by the dotted line 62 in FIG. 1. This allows the cutter to clear the obstruction without damage to the cutter or the mower, it being possible for the cutter 36 to rotate through a full 360 degrees of arc, if necessary. When the obstruction is cleared, the centrifugal force again urges the cutter into the radial position and the normal cutting operation proceeds. Sharpening of the blade is not essential since the cutting elements may easily be replaced by removal of the bolt and the placing thereon of a new sharp blade. This is also true in the event of breakage.

The curved transition 30 along with the upwardly and outwardly extending arcuate portion 32 with the lip 34 at the upper terminus thereof, provides a centrifugal blower capable of producing enough draft of air in the grass in the cutting area, which causes the grass to stand erect for a uniform and complete cutting. Further, this draft of air is necessarily discharged through discharge opening 14 which removes the clippings from the area being cut and discharges them to one side of the mower. As the cutter 36 rotates, the upturned edge at the rear of the blade functions as a propeller to further increase the vertical flow of air in the immediate zone of grass being cut. Since the cutter 36 is of low mass in respect to stones and other solid objects sometimes found in the areas being mowed, such objects are not lifted and thrown from the mower at a high velocity because the inertia of the solid object is sufficient to cause the cutter to rotate against the restraint of the centrifugal force which restricts the accelerating force being applied to the solid object to a very low value, insufficient to produce appreciable velocity. However, such inertia force is sufficient to cut grass and weeds as normally required by such a mower.

Having thus described this invention in such full, clear, concise, and exact terms as to enable any person skilled in the art to which it pertains to make and use the same, and having set forth the best mode contemplated of carrying out this invention, we state that the subject which we regard as being our invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A grass cutting element for a rotary lawn mower having a wheeled housing and vertical drive shaft extending into said housing, said cutting element being adapted to be affixed to said drive shaft and comprising a rotor having a central flat section, a frusto-conical portion extending outwardly and downwardly from said central flat section, a plurality of recesses formed in the frusto-conical section, said recesses being above the conical plane, a cutter blade for each recess, said blade having an off-set shank in the recess, and pivotally mounted therein, the cutter portion of the blade being exposed below the low surface of the rotor.

2. A grass cutting element for a rotary lawn mower having a wheeled housing and vertical drive shaft extending into said housing, said cutting element being adapted to be affixed to said drive shaft and comprising a rotor having a central flat section, a frusto-conical portion extending outwardly and downwardly from said central flat section, a plurality of recesses formed in the frusto-conical section, said recesses being above the conical plane, a cutter blade for each recess, said blade having an off-set perforate shank in the recess, and a post affixed to the bottom of said recess, said blade being pivotally mounted thereon, the height of said post being less than the depth of the recess, whereby the blade is pivotally mounted on the rotor, the cutter portion of the blade being exposed below the lower surface of the rotor.

3. A grass cutting element for a rotary lawn mower having a wheeled housing and vertical drive shaft extending into said housing, said cutting element being adapted to be affixed to said drive shaft and comprising a rotor having a central flat section, a frusto-conical portion extending outwardly and downwardly from said central flat section, a plurality of recesses formed in the frusto-conical section, said recesses being above the conical plane, a cutter blade for each recess, said blade having an off-set perforate shank in the recess, a post affixed to the bottom of said recess, said blade being pivotally mounted thereon, the height of said post being less than the depth of the recess, whereby the blade is pivotally mounted on the rotor, the cutter portion of the blade being exposed below the low surface of the rotor, and a flange extending upwardly and outwardly from the frusto-conical section and positioned above the cutter blade.

References Cited by the Examiner

UNITED STATES PATENTS

| | | | |
|---|---|---|---|
| 2,669,084 | 2/54 | Warren | 56—295 |
| 2,793,484 | 5/57 | McNeill et al. | 56—295 X |
| 2,867,963 | 1/59 | Lawrence et al. | 56—295 |
| 2,875,569 | 3/59 | Sauer | 56—295 |
| 3,000,165 | 9/61 | Lill | 56—295 X |
| 3,010,269 | 11/61 | Maguire | 56—295 |
| 3,014,333 | 12/61 | Clark | 56—295 |

T. GRAHAM CRAVER, *Primary Examiner.*

CARL W. ROBINSON, RUSSELL R. KINSEY,
*Examiners.*